(12) United States Patent
Chevallier et al.

(10) Patent No.: US 8,488,794 B2
(45) Date of Patent: Jul. 16, 2013

(54) METHOD FOR ACCESS CONTROL TO A SCRAMBLED CONTENT

(75) Inventors: Anthony Chevallier, Issy les Moulineaux (FR); Stephane Lanfranchi, Paris (FR); Erwann Magis, Paris (FR)

(73) Assignee: VIACCESS, Paris la Defense (FR)

( * ) Notice: Subject to any disclaimer, the term of this patent is extended or adjusted under 35 U.S.C. 154(b) by 0 days.

(21) Appl. No.: 13/235,872

(22) Filed: Sep. 19, 2011

(65) Prior Publication Data

US 2012/0008781 A1  Jan. 12, 2012

Related U.S. Application Data

(62) Division of application No. 12/094,786, filed as application No. PCT/EP2006/065459 on Aug. 18, 2006.

(30) Foreign Application Priority Data

Dec. 13, 2005 (FR) .................................. 05 53852
Mar. 31, 2006 (FR) .................................. 06 51130

(51) Int. Cl.
*H04K 1/02* (2006.01)
*H04L 9/08* (2006.01)

(52) U.S. Cl.
USPC ............... 380/277; 380/278; 725/25; 725/31; 713/150; 713/155

(58) Field of Classification Search
USPC ............... 380/277–278; 725/25, 31; 713/150, 713/155
See application file for complete search history.

(56) References Cited

U.S. PATENT DOCUMENTS

| 6,898,285 | B1 * | 5/2005 | Hutchings et al. | 380/200 |
|---|---|---|---|---|
| 7,486,793 | B2 * | 2/2009 | Cochard et al. | 380/231 |
| 7,647,641 | B2 * | 1/2010 | Dubroeucq et al. | 726/27 |
| 7,809,942 | B2 * | 10/2010 | Baran et al. | 713/160 |
| 7,848,521 | B2 * | 12/2010 | Leporini et al. | 380/241 |
| 2002/0092016 | A1 | 7/2002 | Offer | |
| 2003/0188154 | A1 * | 10/2003 | Dallard et al. | 713/153 |
| 2004/0088175 | A1 | 5/2004 | Messerges et al. | |
| 2004/0257470 | A1 * | 12/2004 | Leyendecker et al. | 348/552 |
| 2007/0150960 | A1 * | 6/2007 | Dubroeucq et al. | 726/27 |

FOREIGN PATENT DOCUMENTS

| EP | 1 422 943 A1 | 5/2004 |
|---|---|---|
| EP | 1 439 697 A1 | 7/2004 |
| WO | WO 03/105475 A1 | 12/2003 |

OTHER PUBLICATIONS

Dónal Cunningham, et al., "Secure Pay-Per-View Testbed", Proceedings of the International Conference on Multimedia Computing and Systems, XP010154613, ISBN: 0-8186-7105-X, May 15, 1995, pp. 308-311.

"Functional model of a conditional access system", 8301 EBU Review Technical, European Broadcasting Union, XP 000559450, ISSN: 0251-0936, No. 266, Dec. 21, 1995, pp. 64-77.

* cited by examiner

Primary Examiner — Yin-Chen Shaw
(74) Attorney, Agent, or Firm — Oblon, Spivak, McClelland, Maier & Neustadt, L.L.P.

(57) ABSTRACT

A method for access control to a digital scrambled content distributed to a set of installed reception terminals including one master terminal and at least one slave terminal dependent on the master terminal. In the method the slave terminal systematically or occasionally returns at least one item of information about the access condition to the master terminal through a point-to-point link, to enable the master terminal to control access of the slave terminal to the content.

15 Claims, 6 Drawing Sheets

METHOD FOR ACCESS CONTROL TO A SCRAMBLED CONTENT

CROSS-REFERENCE TO RELATED APPLICATIONS

This application is a divisional application of U.S. application Ser. No. 12/094,786 filed May 23, 2008, the entrie content of which is incorporated herein by reference. U.S. application Ser. No. 12/094,786 is a National Stage of PCT/EP06/65459 filed Aug. 18, 2006, and claims priority to French Application Nos. 05/53852 filed Dec. 13, 2005 and 06/51130 filed Mar. 31, 2006.

TECHNICAL DOMAIN

The invention relates to the domain of distribution of contents and more specifically relates to a method for access control to a scrambled content supplied by an operator to a reception terminal with which an access management unit is associated, the reception terminal being provided with at least one access control module, said method comprising the following steps:
associate an access condition with said content comprising a plurality of information necessary for descrambling said content,
transmit said content with said access condition to said terminal.

The invention also relates to an access control system including an emission device comprising a scrambled content server, an access management unit associated with said device, a reception terminal provided with at least one access control module to the scrambled content supplied by said server and with which an access condition is associated comprising a plurality of information necessary for descrambling said content.

The invention also relates to a computer program comprising a first processing module stored in the terminal cooperating with a second processing module stored in the access management unit, said program being designed to implement an access control method conforming with the invention.

The invention is also applicable when the scrambled digital content is distributed to a set of installed reception terminals comprising a master terminal and a plurality of slave terminals dependent on said master terminal, the master terminal acting as an access management unit.

STATE OF PRIOR ART

In a multicast broadcasting context, it is difficult to react efficiently to some forms of pirating, for example such as fraudulent generation of rights or keys required to access contents or attempts to prevent the reception system from taking account of counter-measure messages sent by the operator.

This situation then means that the operator needs to make modifications to the reception system at all subscribers to change his signal so that it can no longer be used by pirate devices. Therefore, the modifications to be made must be sufficiently consequent, and their deployment is then a difficult and expensive operation.

These disadvantages are related particularly to the fact that known access control systems usually have an architecture with no return path. In this type of architecture, the terminal operates independently of the network head. Consequently, once the content has been provided to subscribers, the operator no longer has any means of controlling the rights of subscribers targeted in real time since all the access control is done at the reception terminal.

One form of fraudulently using the digital content consists of using the same security processor, typically a valid smart card, by several terminals so as to process several ECM channels. In this case, a single subscriber is known to the operator for several effective users of the same card.

This form of fraud enables decoders concerned to access a number of different programs equal to the number of rights actually present in the shared card, up to the number of ECMs that the card can process during the control word renewal period. This fraudulent use of the subscriber card by several decoders is done without any control by the operator who cannot prevent it or event limit it.

Another problem arises when a subscriber has several data reception and/or scrambled service terminals. Unless terminals of a particular subscriber are considered as being independent terminals related to the corresponding number of "copies" of this subscriber, the operator does not have any simple solution by which he can control the assignment of inter-dependent access rights or common rights to the different subscriber terminals.

The purpose of the invention is to overcome these disadvantages.

More specifically, the invention aims to distribute access control operations between the input side of the system and the output side, in other words between firstly equipment installed at the operator for which operations are directly under the control of the operator, and secondly the reception terminal that conventionally performs checks on subscriber rights using the access control module. This distribution can limit or even eliminate the autonomy of the terminal from the operator during access control processing.

Another purpose of the invention is to take account of configurations in which the reception terminal has low processing power. This may be the case when mobile terminals are used as reception terminals (mobile telephone, PDA, portable computer, etc.) with limited autonomy in terms of energy and processing power.

Another purpose of the invention is to provide operators with a simple solution for controlled assignment of interdependent access rights or access rights common to different terminals belonging to the same subscriber.

The invention is applicable in conventional cases in which the terminal is provided with the physical access control module, typically a smart card, but it is advantageously applicable when the access control module is not a physical module, but is rather a software module preferably stored in a secure manner in a memory of the terminal.

PRESENTATION OF THE INVENTION

The invention recommends an access control method to a scrambled content supplied by an operator to a reception terminal with which an access management unit is associated, said terminal being provided with at least one access control module.

This method includes the following steps:
a—associating an access condition with the supplied content, comprising a plurality of information necessary to descramble said content,
b—transmitting the content with the access condition to the terminal,
According to the invention, this method also includes the following steps:
on reception of the access condition by the terminal, c—systematically or occasionally sending at least one item of information about said access condition from the terminal to the access management unit through a point-to-point link, d—processing said information by the access management unit to enable or prevent use of the content by the reception terminal depending on the result of said processing.

Thus, when the reception terminal sets up communication with the access management unit through the point-to-point link, this point-to-point link takes control over rights of said terminal to access the requested content and enables or prevents use of the content by the terminal depending on the result of this check. In one preferred embodiment of the method, processing of the information received by the access management unit includes a first step consisting of checking if this information is compatible with access data stored in the terminal, and a second step consists of transmitting at least one control parameter to the terminal to enable or prevent use of the content as a function of the result of the first step.

With the method according to the invention, access control is no longer done exclusively at the reception terminal. This reinforces the protection of the content.

Preferably, when the terminal receives the access condition, the access control module verifies if the received access condition is satisfied using access data previously stored in said reception terminal.

In one variant embodiment, the terminal sends part or all of the information about the access condition to the access management unit, only if the access condition received is not satisfied.

In another variant, the terminal systematically sends said information, independently of the result of the check done by the access control module. This second variant is particularly advantageous when access control is managed essentially at the operator in order to improve security of the content protection system without increasing the number of security mechanisms in the terminal, or even reducing them.

In the preferred embodiment of the invention, the first step in processing information received by the access management unit and the check on the access condition by the reception terminal are done independently of each other, systematically or occasionally, at a time phasing defined by the operator.

The operator is thus capable of making a fine modulation of the spatial and time distribution of the access control between the operator and the reception terminal.

Preferably, the time phasing defined by the operator cannot be predicted at the reception terminal.

In a first application of the method, the access condition is transmitted to the terminal in an ECM message comprising at least one access criterion CA, a cryptogram $CW^*_{Kecm}$ of an encrypted control word CW encrypted by a key $K_{ecm}$. In this application, the access data stored in the terminal include access rights to the content and at least one decryption key.

Step c) in the method then consists of sending at least the cryptogram $CW^*_{Kecm}$ from the terminal to the access management unit, if the access control module does not have the key $K_{ecm}$ to decrypt said cryptogram $CW^*_{Kecm}$. The parameter then sent by the access management unit to the terminal is a control word CW decrypted with the key $K_{ecm}$ and recrypted by a key $K_{ter}$ specifically known to the terminal.

In a second application, the method is used to control the right to reuse a content. In this case, the parameter sent by the access management unit to the terminal is an $ECM_R$ message that will be stored in the terminal with the content, and includes access criteria that will be used to check reading back of said content.

In a third application, the method can also be used to control access to content protected by a DRM license.

In this case, the information sent by the terminal to the access management unit is the DRM license.

The system according to the invention is characterised in that the reception terminal is connected to said access management unit through a point-to-point link through which said access control module systematically or occasionally returns at least one item of the information about said access condition to said access management unit, so as to enable the access management unit to process said information to enable or prevent use of the content by the reception terminal, depending on the result of the processing done by the access management unit.

The access management unit in this system includes means of checking if the information received from the access control module is compatible with access data stored in the terminal, and means of generating and transmitting at least one control parameter to the terminal to enable or prevent use of the content as a function of the result of said verification.

The invention also relates to a reception terminal for a scrambled content distributed by a content distribution device associated with an access management unit.

This terminal includes at least one access control module communicating through a point-to-point link with said access control management unit.

The invention also relates to a computer program designed to implement an access control method controlling access to a scrambled content supplied by an operator, with which an access management unit is associated, at a reception terminal comprising an access control module.

This program includes a first module stored in the terminal comprising instructions to systematically or occasionally forward at least one item of information of said access condition from the terminal to the access management unit through a point-to-point link, said first module cooperating with said second module stored in the access control management unit comprising instructions to process said information and instructions to enable or prevent use of the content by the reception terminal, depending on the result of said processing.

The method according to the invention is also applicable in an access control system comprising an emission device comprising a content server, a master terminal, a slave terminal dependent on said master terminal, said content server comprising means of distributing a scrambled digital content with which an access condition is associated with said terminals, comprising a plurality of information necessary for descrambling of said content.

This system is characterised by the fact that the slave terminal can be connected to the master terminal through a point-to-point link through which said slave terminal returns at least one item of information extracted from the received access condition to said terminal, so as to enable said master terminal to process said information to enable or disable use of the content by the slave terminal.

To achieve this, the master terminal includes:
means of verifying if the information received from the slave terminal is compatible with access rights previously allocated to the slave terminal, and
means of generating and transmitting at least one control parameter to said slave terminal to enable or prevent use of the content, depending on the result of said verification.

The master terminal may be integrated into the emission device or into a collective reception antenna.

In all cases, the master terminal includes software capable of processing information transmitted by the slave terminal to enable or prevent use of the content by this slave terminal.

In this architecture, the method includes the following preliminary steps:

associate an access condition with said content comprising a plurality of information necessary for descrambling the distributed content, assign a common session key $K_s$ to said master terminal and said slave terminal, transmit a datastream to the terminals containing the scrambled digital content and the access condition, on reception of the datastream, the slave terminal extracts the access condition from the received datastream and systematically or occasionally returns at least one item of information about said access condition to the master terminal, through a point-to-point link set up with the master terminal, and on reception of the information forwarded by the slave terminal, the master terminal verifies if this information is compatible with access rights previously allocated to said slave terminal, and returns at least one command parameter to this slave terminal, encrypted by the session key $K_s$ authorising use of the content if said information is compatible with said access rights, or preventing use of the content if said information is not compatible with said access rights.

Thus, the invention enables the operator to control the association between a master terminal and slave terminals, by controlling assignment of the session key $K_S$ to a master terminal and to the associated slave terminals. The operator can thus use the master terminal to control access to a content by the slave terminal.

By transferring the rights control function from the slave terminal to the master terminal, it is possible to use digital contents in several auxiliary terminals that do not have a security processor and on which the manufacturer prevents the need for a card reader. This minimises the cost of installed auxiliary terminals associated with a master terminal. This advantage is particularly significant when there are many terminals installed (hotel or hospital, etc.)

In one variant embodiment, the master terminal does not have a smart card, but simply performs a gateway function between installed slave terminals and the access management unit associated with the operator. In this case, the master terminal systematically calls on the access management unit associated with the operator to process an access request from a slave terminal.

In another variant embodiment, the master terminal is provided with a smart card but only uses it occasionally.

In this case, when it does not use a smart card, the master terminal calls upon the management unit to process an access request from a slave terminal.

As in the previous case, if the master terminal does not do the processing using said smart card, all it does is to act as a gateway between the installed slave terminals and the access management unit associated with the operator.

When the method is used in a conditional access system (CAS), the access condition is transmitted in an ECM message comprising at least one access criterion CA and a cryptogram $CW^*_{Kecm}$ of a control word CW used to encrypt the content.

On reception of the access condition, the slave terminal returns at least the cryptogram $CW^*_{Kecm}$ to the master terminal, and typically the access criterion CA.

After verifying the rights of the slave terminal, if the slave terminal is authorised to use the content, the master terminal transmits the control word CW decrypted using the key $K_{ecm}$ and recrypted using the session key $K_s$, to the slave terminal.

In another variant embodiment, the parameter transmitted by the master terminal to the slave terminal is an $ECM_R$ message that will be saved with the content and includes access criteria that will be used for controlling reuse of said content.

When the distributed content is protected by a DRM license, the information returned by the slave terminal to the master terminal is the DRM license.

In both applications (CAS and DRM), the method according to the invention is used by a computer program comprising a first module stored in the slave terminal comprising instructions to extract the access condition from the received datastream and to return at least one item of information about said access condition to the master terminal through a point-to-point link set-up with the master terminal, said first module cooperating with a second module stored in the master terminal containing instructions to process said information and instructions to enable or prevent use of the content by said slave terminal, depending on the result of said processing.

BRIEF DESCRIPTION OF THE DRAWINGS

Other characteristics and advantages of the invention will become clear from the following description given as a non-limitative example, with reference to the attached drawings in which.

DETAILED PRESENTATION OF PARTICULAR EMBODIMENTS

We will now describe the invention by means of a particular application of the method to control access to programs or multimedia contents broadcast to subscribers with access rights.

In the following description, identical references will be used in the different figures to denote elements that perform identical or equivalent functions. Note that the method may be used in any connected network with a sufficiently high speed return channel such as a DSL (Digital Subscriber Line) wired network, or a wireless network of the Wi-Fi or Wi-Max (or ASFI—Wireless Internet Access), or a 3G mobile type.

Figure 1:
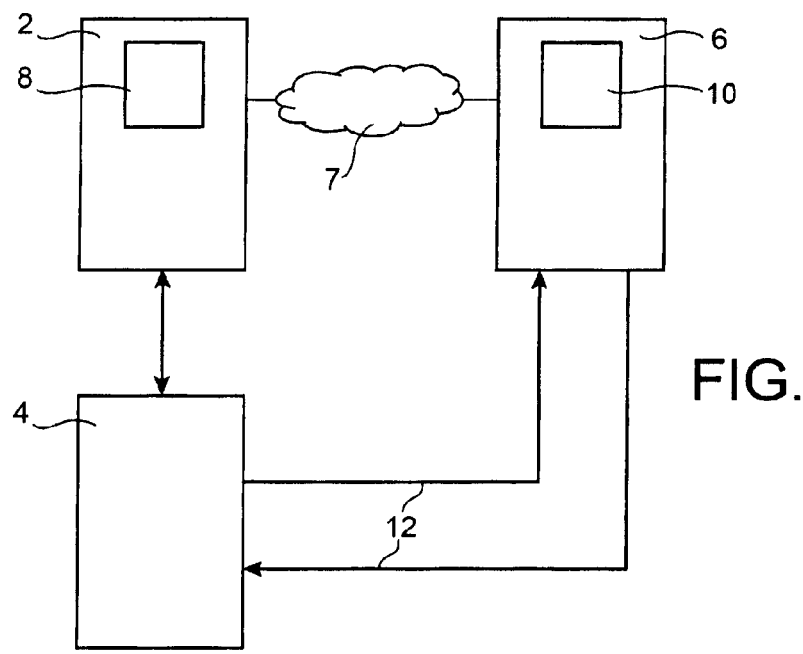
FIG. 1 shows a general scheme of an access control system according to the invention.

FIG. 1 illustrates a general diagram of a content distribution system in which the method according to the invention could be used.

This system includes an emission device 2 associated with an access management unit 4 and a reception terminal 6.

The emission device 2 includes a content server 8 distributing scrambled contents to the terminal 6 through a transport network 7 such as a wired network or a radio broadcasting network; or through a DSL line, and the terminal 6 includes an access control module 10 that may be a smart card or preferably a software module performing control functions.

The terminal 6 is connected to the access management unit 4 through a two directional point-to-point link 12.

Figure 2:
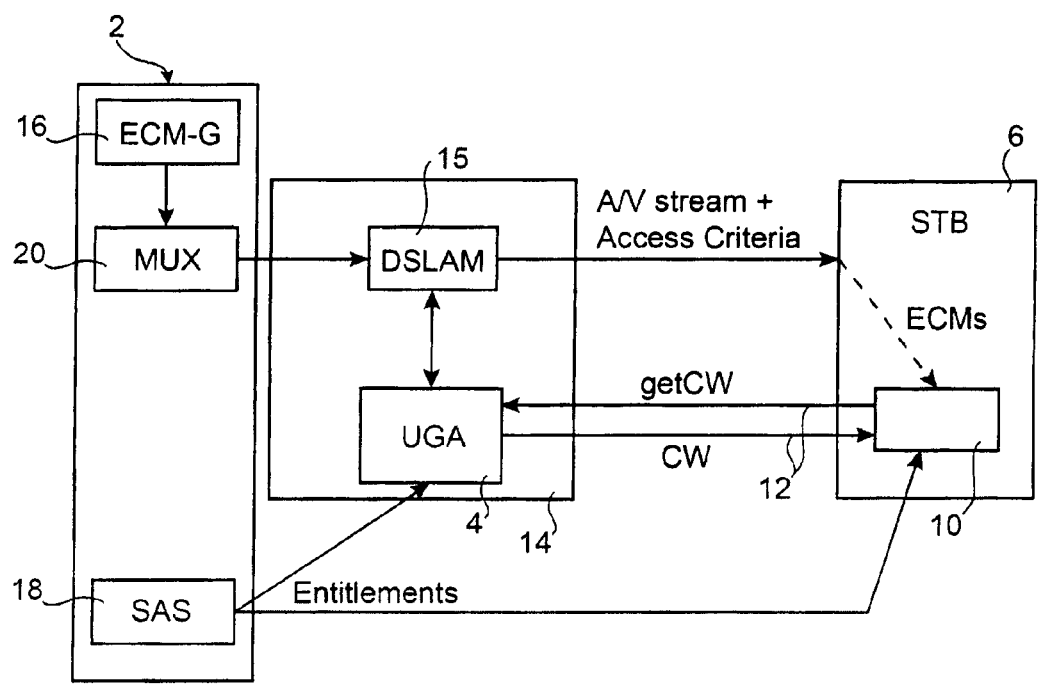
FIG. 2 schematically shows a first example of the system in FIG. 1.

With reference to FIG. 2 that schematically illustrates a particular example of a system in FIG. 1, the reception terminal 6 is a digital decoder installed at the subscriber and the link between the operator and subscribers is made through a DSL line, through an intermediate equipment 14 comprising a DSLAM (Digital Subscriber Line Access Multiplexer) 15 communicating with an access management unit 4 (UGA). This UGA is integrated into the equipment 14.

Note that the access management unit 4 may be installed at a trusted third party with the role of controlling the rights of subscribers under the supervision of the operator without going outside the framework of the invention.

The emission device 2 includes an ECM-G (for Entitlement Control Message Generator) module 16 that will calculate and broadcast operation messages ECM, a SAS module 18 (Subscriber Authorization System), designed to calculate and broadcast EMM (Entitlement Management Message) messages necessary for several purposes including to send rights and keys to subscribers and a MUX multiplexer 20 that will form a package of contents starting from programs and/ or services supplied by the operator.

For example, the terminal 6 may be composed of a multimedia content decoder/descrambler, known in the prior art as a Set Top Box (STB). It is provided with a security processor 10 specially designed to process access control to contents and management of rights and cryptographic secrets (keys). One well known example of such a security processor is the smart card connected to the terminal. Another example of the security processor 10 may also be made by a dedicated software function integrated into the terminal.

The method according to the invention will now be described with reference to FIGS. 3 to 7.

The contents supplied represent multimedia programs broadcast in scrambled form by a control word CW.

The terminal 6 is provided with a key $K_{Diff}$ common to terminals addressed by the operator, a key $K_{Ter}$ specific to this terminal and a right $D_{Oper}$. These keys and this right were previously loaded in the security processor, typically by an EMM message. Furthermore, if the subscriber performs an illegal action, the security processor contains a fraudulently acquired right $D_{Fraud}$.

The access management unit 4 already has the key $K_{Oper}$, the key $K_{Ter}$ of each terminal and knows what rights $D_{Oper}$ are possessed by each terminal.

Figure 3:
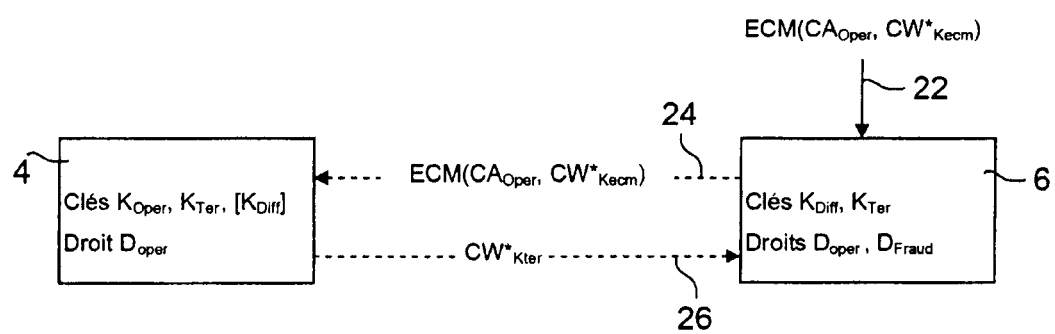
FIG. 3 is a block diagram illustrating a particular application of the method according to the invention.

With reference to FIG. 3, the access condition is transmitted to the terminal (arrow 22) in an ECM message generated by the ECM-G 16 of the emission device 2. This ECM message includes an access criterion $CA_{oper}$ and the cryptogram $CW^*_{Kecm}$ of the control word CW encrypted by a key $K_{ecm}$ that is either the key $K_{Oper}$ known only to the operator, or the key $K_{Diff}$ known to all the operator's terminals. Thus, it is possible to access a program with which the ECM message is associated provided that the terminal has at least one right $D_{Oper}$ satisfying the access criterion $CA_{Oper}$ and the key $K_{ecm}$ used to obtain the control word CW by decryption of the cryptogram $CW^*_{Kecm}$ which is the case in this example if the key Kecm is the key $K_{Diff}$.

On reception of programs, the terminal 6 returns (arrow 24) the received ECM to the access management unit 4.

In a first variant embodiment of the method in which the operator wants to systematically control descrambling of the content using the terminal, the key $K_{ecm}$ is the key $K_{Oper}$ that is not transmitted to the terminal 6. In this case, the terminal systematically returns the ECM to the access management unit 4.

In another variant embodiment in which control over descrambling of the content is shared between the terminal and the operator, the terminal occasionally sends the ECM to the access management unit 4 after the module 10 has made a prior check of the access criterion.

In this variant, the terminal returns the ECM if, for example, the subscriber does not have the right $D_{oper}$ that would make it possible to verify the access criterion or if the terminal does not have the decryption key $K_{ecm}$ of the cryptogram $CW^*_{Kecm}$. On the other hand, if the terminal does have the right satisfying the access criterion and if the cryptogram $CW^*_{Kecm}$ can be decrypted with the key $K_{Diff}$, the terminal accesses the program as in prior art.

When the access management unit 4 receives the ECM from the terminal 6, it verifies if the terminal 6 has the rights necessary to access the received programs.

In a first embodiment, the access management unit has a database in which descriptions of rights that the operator sent to the subscriber terminal have been stored. The access management unit thus checks the access criterion against rights that the subscriber has officially. This mode disables any check on the access criterion against illegal rights that the subscriber could have fraudulently loaded into its terminal.

In a second embodiment, the access management unit does a remote read of the content of the security processor of the terminal and checks the access criterion against the rights actually present in the terminal. This mode eliminates the need for the access management unit to support a database of rights of all subscribers and also makes it possible to check the content of security processors by checking the checksum or another similar method.

When the check made by the access management unit on the rights of the terminal is successful, the access management unit returns a control parameter to the terminal to enable access to the content.

Otherwise, it does not return this parameter to the terminal, thus preventing access to the content.

When the access criterion is actually satisfied by the access management unit 4, the access management unit decrypts the cryptogram $CW^*_{Kecm}$ using the key Kecm, recrypts the control word CW with the key $K_{ter}$ known specifically to the terminal and returns the cryptogram $CW^*_{Kter}$ of the control word thus recrypted to the terminal (arrow 26). The key $K_{Ter}$ is determined as a function of the identification of the terminal made by the access management unit while setting up the point-to-point link 12 using any authentication method according to the state of the art and external to the method.

In one special variant embodiment of the method, the terminal sends (24) the cryptogram $CW^*_{Kecm}$ extracted from the ECM to the access management unit only. In this case, the access management unit 4 considers that the access criterion is implicitly always satisfied and only does the decryption/ recryption of the control word CW. Thus, the operator continues to control descrambling by the terminal through use of the specific key $K_{Ter}$.

According to one advantageous characteristic of the method, the check on the access criterion by the access control module 10 of the reception terminal 6 and the processing of the ECM by the access management unit 4 are done independently of each other at a time phasing defined by the operator.

Figure 4:
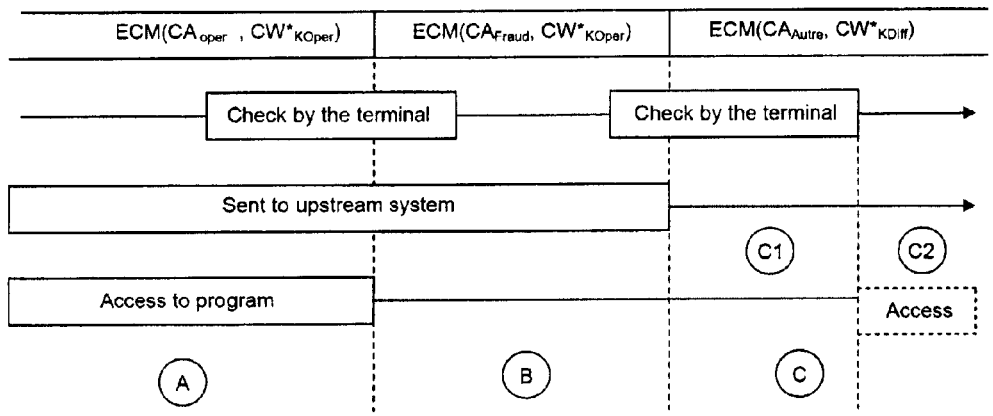
FIGS. 4 to 6 represent a time diagram illustrating the time phasing of the method according to the invention.
Figure 5:
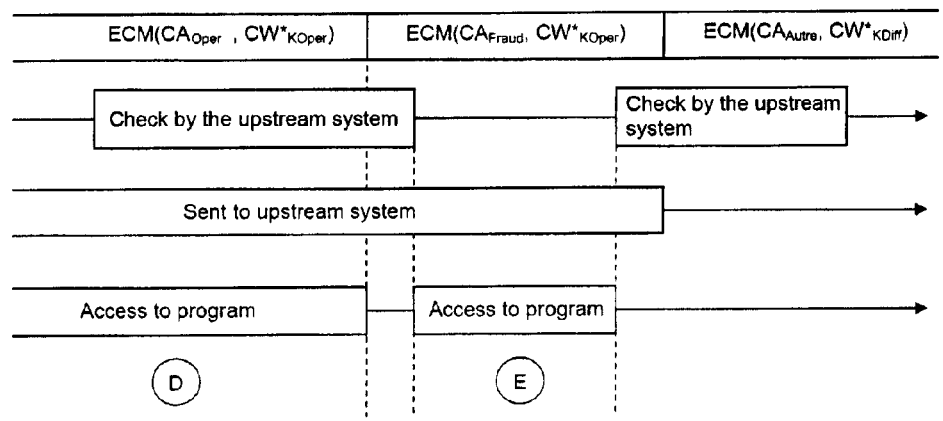
Figure 6:
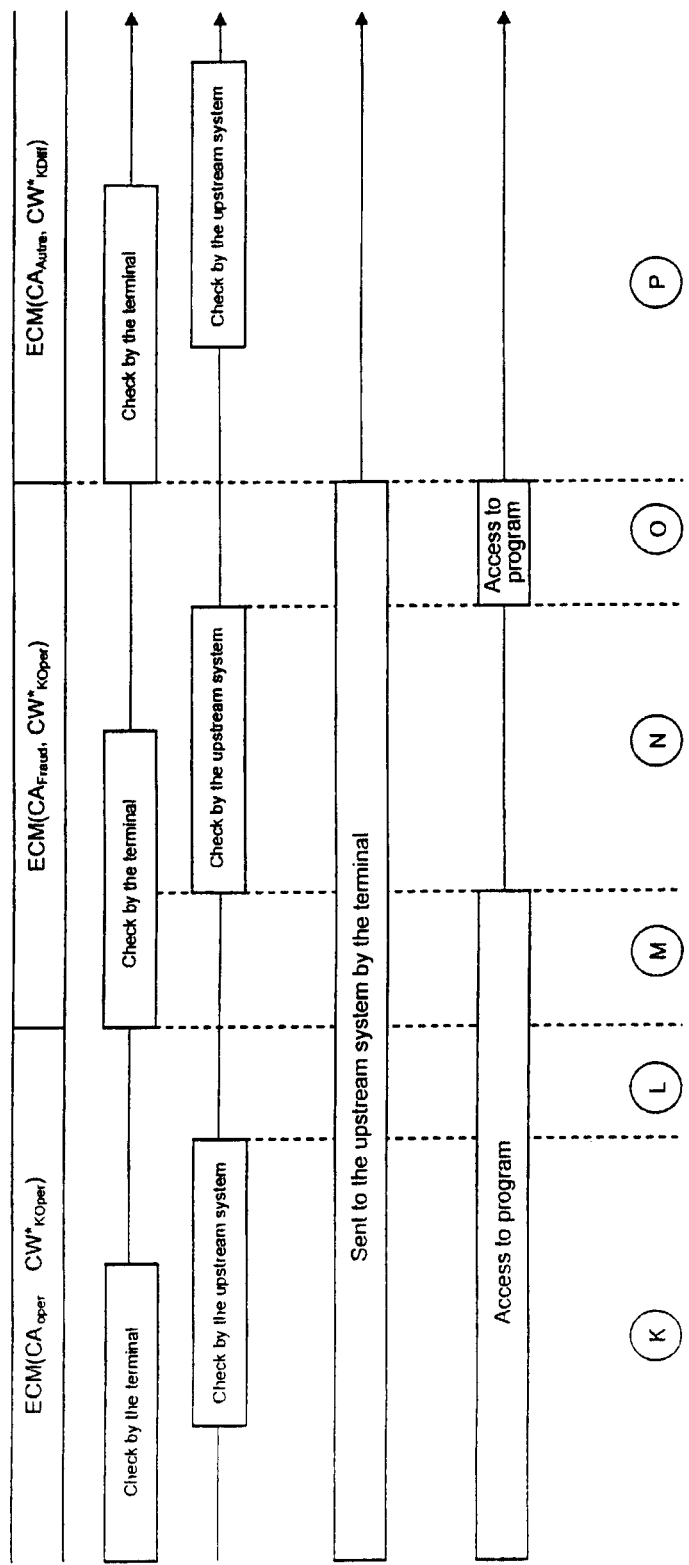

This time phasing will be described below with reference to FIGS. 4 to 6.

As described above, the terminal 6 is typically provided with:
- the key $K_{Diff}$ representing an instance of $K_{ecm}$ that enables it to obtain the CW when the ECM transports the cryptogram $CW^*_{KDiff}$. This key is common to a set of terminals.
- the key $K_{Ter}$ dedicated to this terminal 6, used to obtain the control word CW starting from the cryptogram $CW^*_{KTer}$ sent to the terminal by the access management unit 4.
- an access certificate $D_{Oper}$ received officially from the access management unit 4 that knows its existence in the terminal 6.
- an access certificate $D_{Fraud}$ obtained fraudulently by the terminal user. Therefore, the access management unit 4 is not aware that the terminal holds this access certificate.

The access management unit 4 typically has:
- the key $K_{Oper}$ representing another instance of $K_{ecm}$ that enables it to obtain the control word CW when the ECM transports the cryptogram $CW^*_{KOper}$. This key is known only to the access management unit 4.
- the key $K_{Ter}$, dedicated to the terminal 6 considered, which is used to provide the control word CW to this terminal 6 in the form of a cryptogram $CW^*_{KTer}$.
- the access certificate $D_{Oper}$ that the access management unit 4 officially sent to the terminal 6.

In order to illustrate the different situations, three distinct values are defined for the access condition CA:
- $CA_{Oper}$: this condition is satisfied by the terminal legally holding the right $D_{Oper}$,
- $CA_{Fraud}$: this condition is satisfied by the terminal 6 fraudulently holding a right $D_{Fraud}$,
- $CA_{Autre}$: this condition is not satisfied by a terminal that does not hold any corresponding right.

Phases A, B and C illustrate the effect of the time phasing of the check on the access condition by the terminal on access to the program.

At A: The ECM is sent to the access management unit 4 by the terminal 6 either because the terminal does not check the ECM, or because it has found a right satisfying the access condition but the control word is encrypted by the key $K_{Oper}$ that it does not have. The program can be accessed during this period because the access management unit 4 observes that the access condition is satisfied. It sends the cryptogram $CW^*_{KTer}$ of the control word encrypted with the key of the terminal, to the terminal.

At B: the ECM is returned to the access management unit 4 either because the terminal 6 does not control the ECM, or because it has found an illegal right satisfying the access condition whereas it does not have the key $K_{Oper}$. Access to the program is prohibited during this period because the access management unit 4 observes that the access condition cannot be satisfied by the official rights of the terminal 6. It does not send a cryptogram of the control word CW.

At C: The ECM is not sent to the access management unit 4 because the terminal has the key $K_{Diff}$ used to decrypt the cryptogram $CW^*_{Kecm}$. If the terminal is in a time phasing in which it must control the access criterion (C1), there is no access to the program because the access criterion $CA_{Autre}$ cannot be satisfied by a right available in the terminal. If the terminal does not control the access criterion (C2), due to the time phasing, then the program can only be accessed by decryption of the control word. Obviously, this latter case C2 must be avoided when the method is used, for example by forcing the control of the access criterion independently from the time phasing provided that the cryptogram $CW^*_{Kecm}$ can be decrypted by the terminal.

Phases D and E illustrate the effect of time phasing of the check on the access condition by the access management unit 4 on access to the program.

At D: the program is accessed either because the access management unit 4 does not check the access condition and by default considers it to be satisfied, or because this access management unit 4 checks the access condition and finds it satisfied.

At E: The program is accessed because the access management unit 4 does not verify the access condition and by default considers it to be satisfied, whereas the terminal 6 uses an illegal right.

Phases K to P illustrate the effect of the time phasing of the check on the condition for joint access to the program by the terminal and by the access management unit 4, on access to the program.

At K: access to the program is authorised because the access condition is shown to be satisfied by terminal 6 and/or by the access management unit 4 and possibly estimated satisfied by default by only one of these two modules.

At L: access to the program is enabled because the access condition is observed to be satisfied by default by the terminal 6 and by the access management unit 4. These two decisions are conforming with the access condition/official right combination.

At M: access to the program is authorised because the access condition is actually observed to be satisfied by the terminal 6 and is observed to be satisfied by default by the access management unit 4. In this case, the access management unit 4 does not detect that the terminal 6 is using an illegal right.

At N: There is no access to the program because the access condition is observed as being not satisfied by the access management unit 4 that does not know the illegal right that the terminal 6 is using.

In the first part of this case, the access management unit 4 detects that the terminal 6 has an illegal right if the terminal 6 specifies to it that it has a valid right.

At O: Access to the program is authorised because the access condition is considered to be satisfied by default by the terminal 6 and by the access management unit 4.

At P: The ECM is not sent to the access management unit 4 because the terminal has the key $K_{Diff}$ used to estimate the control word CW. Control by the access management unit is ineffective. This phase is similar to the phase C described above and it must benefit from the same particular implementation to prevent access to the program when the terminal is not in control.

The steps in the method according to the invention will now be described with reference to FIG. 7.

Figure 7:
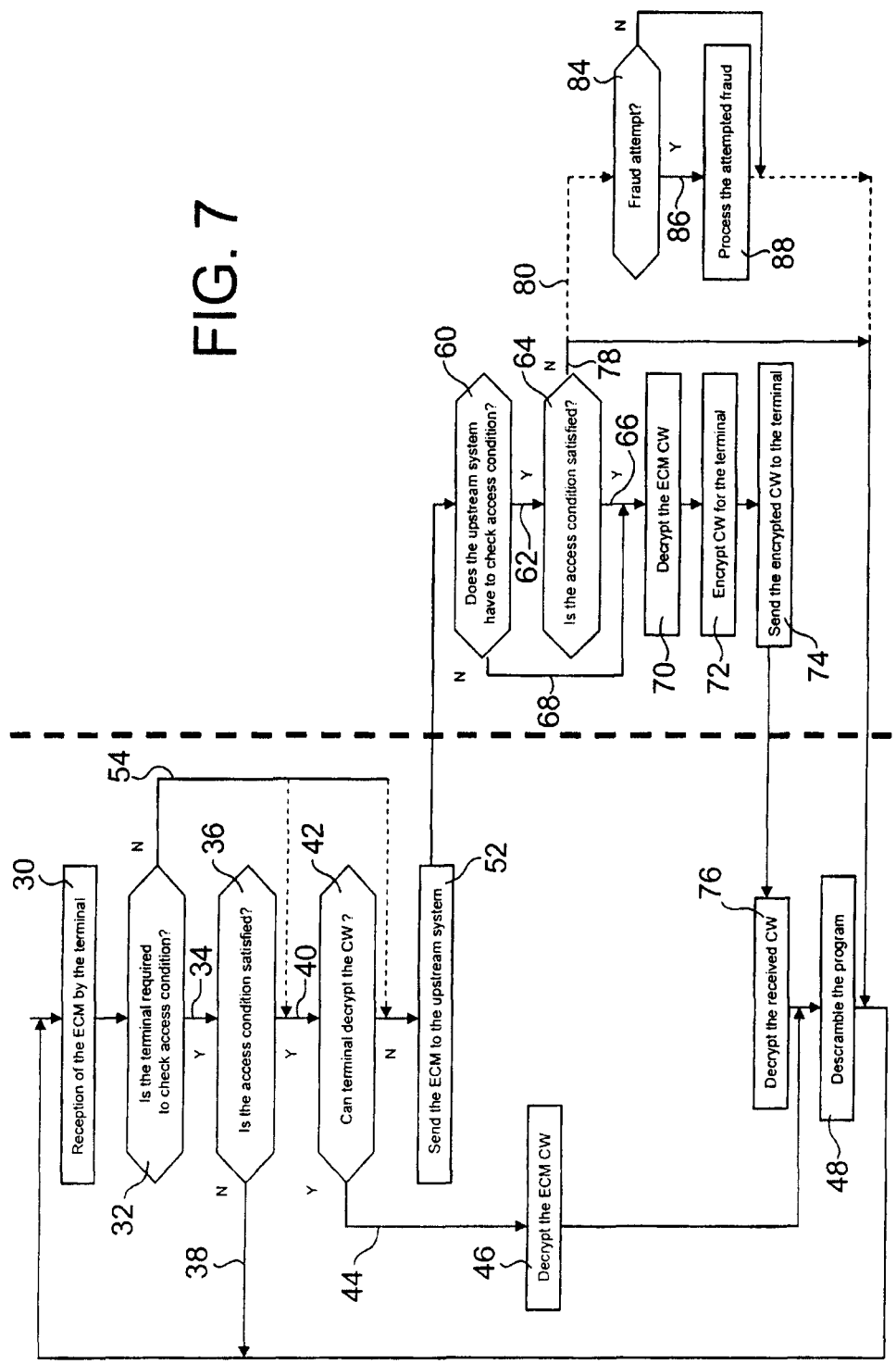
FIG. 7 is a flowchart illustrating the steps of one embodiment of the method according to the invention.

In this FIG. 7, the steps represented in the left part correspond to processing done by the terminal 6, and steps shown in the right part correspond to processing done by the access management unit 4.

When the subscriber wants to access a program, the terminal 6 acquires the digital datastreams containing the video, audio and other components of the program and the ECM messages.

For each received ECM message (step 30), the terminal verifies if it is in a period in which it is required to control the access condition (step 32). The test carried out in step 32 materialises the time phasing of the method at the terminal 6. If the terminal is to do this check (arrow 34), the access condition contained in the ECM is compared with rights present in the terminal (step 36).

If no right satisfies the access condition (arrow 38), the processing done on the ECM is terminated, there is no access to the program and the terminal 6 waits for the next ECM message (step 30). If the access condition is satisfied by a right present in the terminal (arrow 40), the terminal 6 verifies (step 42) if it has the key $K_{ecm}$ that enables it to decrypt the control word CW. This step materialises activation of the method by the operator.

If the terminal 6 has the key $K_{ecm}$ (arrow 44), it decrypts the control word CW (step 46) and can access the program by descrambling (step 48).

Otherwise, it sends the ECM message to the access management unit 4 (step 52).

If the terminal 6 is not in a period in which it needs to control the access condition (arrow 54), two scenarios could be envisaged:
- either it verifies (step 42) whether or not it can obtain the control word CW itself without using the access management unit 4,
- or it systematically returns (step 52) the ECM to the access management unit 4.

In the first case, as described above, it decrypts (step 46) the control word CW if the verification is positive. The terminal 6 then processes the access control.

In the second case, the terminal 6 must systematically make use of the access management unit 4. In this case, there can be no access to the program without the access management unit 4 checking the access condition.

When the terminal sends (step 52) an ECM to the access management unit 4, the access management unit checks (step 60) if it is within a period in which it must check the access condition of the ECM.

The step 60 materialises the time phasing of the method at the access management unit 4.

If the access management unit 4 has to check the access condition (step 62), it compares (step 64) this access condition with the rights of the terminal 6.

As described above, the access management unit 4 makes this comparison starting from its own database of subscriber terminal rights without explicitly sending a query to the terminal 6. Only legal rights are considered in this processing to agree to or to refuse access to programs. As a variant, it may also perform this comparison by making a remote query to the security processor of the terminal. In this case, the presence of illegal rights may be detected, for example by checksums on observed rights in this processor.

If the access condition is satisfied (arrow 66), or if the access management unit 4 does not need to check the access condition (arrow 68), the access management unit 4 decrypts the control word CW of the ECM (step 70), encrypts the control word CW (step 72) obtained with a key $K_{ter}$ dedicated to the terminal 6 and sends (step 74) the cryptogram obtained to the terminal 6. This terminal decrypts (step 76) the control word CW with its dedicated key and descrambles (48) the program.

If the access management unit 4 considers that the access condition is not satisfied (arrow 78), in accordance with the rights of the terminal 6, it will not provide the terminal 6 with the control word CW necessary to descramble the program.

In one variant embodiment of the method illustrated by the dashed lines (arrow 80), in which the terminal 6 has specified, through the ECM and during step 52, that it has a right satisfying the access condition, the access management unit 4 then correlates (step 84) this information with its own conclusion and it can detect (arrow 86) that the terminal 6 is attempting to illegally access the content and trigger (step 88) an appropriate processing for such an attempted fraud.

The method according to the invention can also be used in a context of reusing a content previously obtained using the method, for example for reading or redistribution of a stored content.

In this case, the parameter sent by the access management unit 4 to the terminal 6 is an $ECM_R$ message to be stored in the terminal with the content and comprising access criteria designed to check reuse of said content, for example reading or redistribution. When reading or reusing the content, the $ECM_R$ message will be processed according to the method, depending on its composition, by calling the access management unit 4, or according to prior art by the single terminal.

The method can also be applied to reinforce the access control in a DRM system.

In this case, a single key is usually required to unscramble the entire content. This key is provided independently of the content itself, encapsulated in a license specific to the destination reception system.

In this context, the proposed method is applied by building up the license in a manner specific to the upstream system, such that the reception system cannot use this license without using the upstream system, the upstream system then being able to verify the right of the reception system to access the content considered, then if necessary recreating the license in a manner specific to this reception system.

Figure 8:
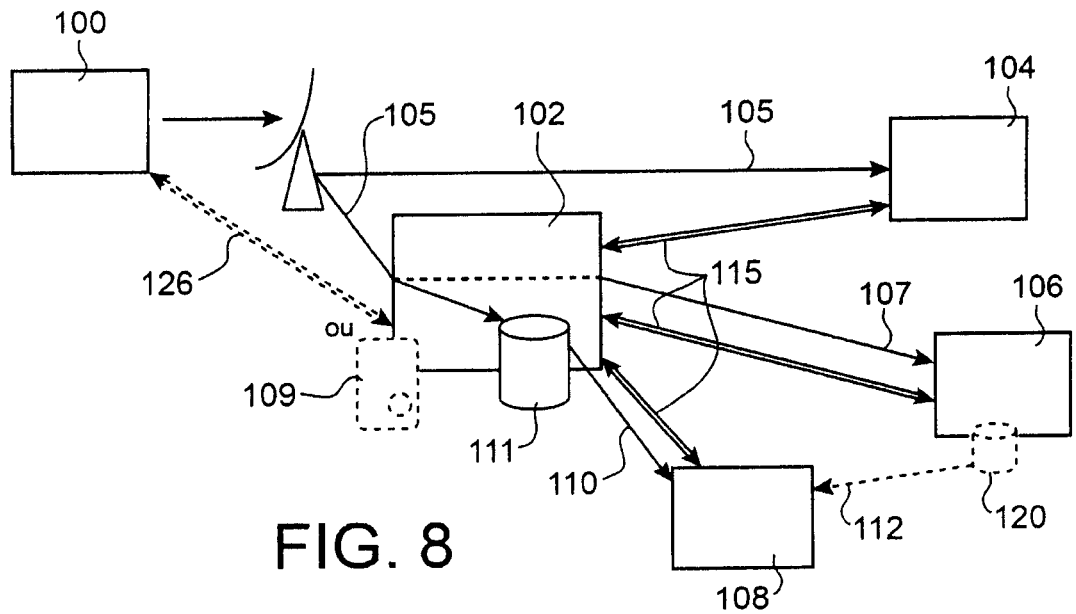
FIG. 8 schematically illustrates a second application of the method according to the invention in which the access control is managed by a master terminal with which several slave terminals are associated.

FIG. 8 diagrammatically illustrates a distribution architecture of contents and/or services designated in the following as << contents >>, in which an operator 100 provides a scrambled content to a set of terminals (102, 104, 106, 108) in a single entity, such as a single family household, containing several terminals to enable a subscriber to display different contents on several audiovisual receivers, as a function of different rights assigned to this subscriber by the operator.

In the example illustrated in this FIG. 8, the master terminal 102 and the slave terminals are provided with demodulation devices (DVB-S, DVB-C, DVB-T demodulator, IP modem, etc.) adapted to the distribution networks to which they are connected. Furthermore in this example, the master terminal 102 is provided with a security processor such as a smart card 109 and the slave terminals (104, 106, 108) do not have a smart card but they can access contents of the operator by connecting to the master terminal 102 through which they can obtain access to said contents.

Note that the subscriber can use the master terminal 102 to access the contents in a conventional manner.

The master terminal 102 and the slave terminal 104 receive a scrambled content directly (arrows 105) from the operator 100, the slave terminal 106 receives (arrow 107) a content through the master terminal 102, the slave terminal 108 receives (arrow 110) a content stored in a local memory 111 of the master terminal 102 or in a local memory of the slave terminal 106 (arrow 112).

However, note that a slave terminal (104, 106, 108) may be provided with a smart card so that access control to contents is done partially by the slave terminal and partially by the master terminal, with time phasing controlled by the operator as described above.

The architecture described in FIG. 8 is also applicable to other entities such as a home gateway or a collective antenna, without going outside the framework of the invention.

In all cases, slave terminals 104, 106 and 108 each have a point-to-point link (arrow 115) with the master terminal 102, and return information extracted from the access condition associated with the content to said master terminal 102 through this point-to-point link, to enable a master terminal 102 to manage the access control to this content.

This architecture may also be extended to a cascade type organisation of the terminals. A slave terminal may be the master terminal of other slave terminals that are connected to it. This extension capacity provides the means of building up particular functional topologies of terminals. The limitation of such an architecture extension originates from response times induced by multiple cascades of terminals.

In one preferred embodiment of the invention, the slave terminals are equipped with a secure electronic chip with which they decrypt the cryptogram of the control word supplied by the master terminal.

In this case, improved security of access to the content by one of the slave terminals 104, 106 and 108 is obtained by joint use of the single smart card inserted in the master terminal 102 and the electronic chip in each of the slave terminals 104, 106 and 108. In another embodiment, this decryption function is done by a dedicated secure software module of the slave terminal.

The solution is equally well applicable to contents broadcast directly and to contents stored in advance by the master terminal 102 or by another slave terminal 106.

The operator can define slave terminals authorised to be managed by the master terminal from his upstream system, thus introducing a domain concept. Thus, an unauthorised slave terminal will not be able to decrypt contents output from the master terminal.

In one preferred embodiment, the operator controls slave terminals authorised to operate with a master terminal by controlling distribution of the session key, as will be described later.

As a variant, the operator can also limit the number of slave terminals that can call on a single master terminal by creating an explicit list containing identifiers of authorised or prohibited terminals. In this case, control of a slave terminal depends on its authorisation to use a point-to-point link set up with the master terminal. The operator can then choose the number of authorised terminals in the list.

In all cases, only authorised slave terminals receive a session key compatible with the master terminal to which they are connected.

Elimination of a slave terminal from the list of authorised terminals is also controlled by the operator typically by excluding this terminal from the list of slave terminals to which a new session key is sent.

Reception and Recording of Contents by the << Master >> Terminal

Access by the master terminal to contents for use, recording or reading or these contents, is controlled in accordance with the method in FIG. 1 described above, using its smart card if the terminal has one and/or the operator's access management unit 4. When the access condition is received, the master terminal 102 returns at least one item of the information about said access condition to the access management unit 4 through the point-to-point link 12. This access management unit processes said information to allow or prevent use of the content by the master terminal 102. This processing of the contents by the master terminal is not modified because slave terminals can request it elsewhere.

On the other hand, due to its status as master, the master terminal 102 has an addition function by which it can be called upon by slave terminals 104, 106, 108 to check their access to contents. It can also be provided with the capability of transmitting contents that it receives (terminal 106) or contents that it has stored (terminal 108) to slave terminals. This operation is controlled by the operator by programming datastreams/services in the master terminal 102 that can be redirected to one (or all) slave terminals 104, 106 or 108.

Use of a Content by a Slave Terminal

A slave terminal receives contents/services directly (terminal 104) from the upstream source, for example through a satellite link, through (terminal 106) the master terminal, or after they have been stored (terminal 108) on another master or slave terminal.

On reception of the content and the associated access condition (ECM), the slave terminal 104, 106 or 108 is connected to the master terminal 102 through the communication channel 115, and it transmits the ECM message to the master terminal 102 for processing. Since data sent to the master terminal 102 by the slave terminal 104, 106 and 108 are encrypted, the communication channel 115 does not have to be secure.

The master terminal 102 then submits the ECM to the smart card 109 that decrypts the control word CW if access conditions are satisfied, and locally re-encrypts it with a session key $K_S$.

The master terminal 102 sends the control word CW thus locally re-encrypted to the slave terminal 104, 106 or 108.

On reception of the control word CW thus re-encrypted, the slave terminal 104, 106 or 108 submits the cryptogram of the CW to the secure electronic chip that decrypts it with the session key $K_S$ and applies the decrypted control word CW to the descrambler.

Note that the operator can check if a slave terminal 104, 106 or 108 is associated with the master terminal 102 by controlling the presence of the session key $K_S$ in this slave terminal. Thus, only a slave terminal with the right session key $K_S$ is capable of obtaining the control word CW and therefore decrypting the contents redistributed by the master terminal 102 or received directly.

Note also that the function of the secure electronic chip may be performed by a security processor such as a smart card or a software module without going outside the framework of the invention.

The method according to the invention is also applicable when the slave terminal 106 records the content in a local memory 120 instead of using it directly (typically for display). In this case, if the access conditions are satisfied, the master terminal 102 provides the slave terminal 106 with ECM messages to be saved with the datastream.

When reading a saved content, the slave terminal 106 or 108 calls upon the master terminal 102 to process the access conditions, in the same way as for a content processed on reception.

Management of the Session Key

The session key designed to encrypt the control word CW that the master terminal 102 sends to the slave terminal 104, 106 or 108 is known to the master terminal 102 and the slave terminals 104, 106 and 108 in a single group of installed equipment.

This session key is loaded into terminals 102, 104, 106, 108 when the installed equipment is being set up, during a step to initialise these terminals. In one preferred embodiment, the operator loads this session key into the smart card of the master terminal 102 using a management message (EMM). The operator also sends it to the slave terminal 104, 106 or 108, for example using an EMM message, to be stored in the secure electronic chip. These loading operations done by EMM may apply to the session key itself or to a data, typically secret, used by both parties to calculate the session key.

Figure 9:
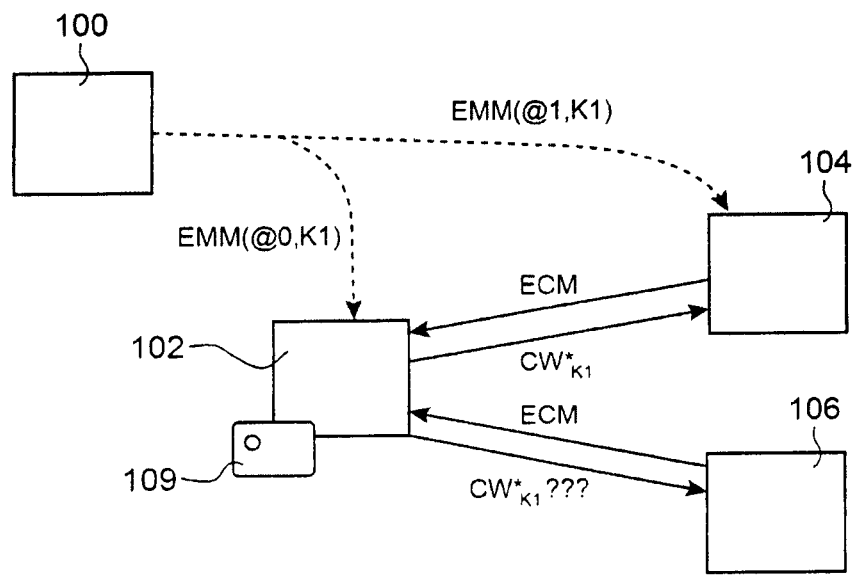
FIG. 9 schematically illustrates a control procedure for authorisation of a slave terminal to use the digital content.

FIG. 9 diagrammatically illustrates a procedure for checking the authorisation of a slave terminal to use the digital content.

In the example illustrated in this FIG. 9, an address @i is assigned to each installed terminal. The terminals 102 and 104, with addresses @0 and @1, respectively, have the same session key K1 loaded by the operator while the terminal 106 with address @2 has another session key K2. The slave terminal 104 may cooperate with the master terminal 102, because it can decrypt the cryptogram $CW^*_{K1}$ with the key K1 to obtain the control word CW.

On the other hand, the slave terminal 106 that has the session key K2 cannot decrypt the cryptogram $CW^*_{K1}$ that will be sent to it by the master terminal 102 using the session key K1.

The result is that the operator fully controls sharing of the card between the terminals through the check on the session key shared by the master terminal 102 and the slave terminals (104, 106), Checking Normal Use of the Terminal The method according to the invention can be used by a single master terminal to process one or several ECMs. A terminal can call upon the access management unit 4 (FIG. 1) to process the ECM channel that it will use to access a content. It can also call upon this access management unit 4 to simultaneously process several contents, which results in a corresponding number of ECM channels to be processed.

Simultaneous access to several contents by a single master terminal 102 may be normal. This is the case in which a program is composed of several components, for example such as one access condition for an image and the original soundtrack, another access condition for a different language, yet another for subtitles for persons hard of hearing. This is also the case when the terminal is a gateway terminal, in other words equipment acting as an entry point into a single entity (for example a single household) and federating accesses of several terminals to distributed contents.

On the other hand, simultaneous access to several contents by a single master terminal 102 can be used to divert an official access and increase the number of unauthorized accesses to contents.

One possible means of detecting this fraudulent use consists of observing the number and type of requests made to the access management unit 4 by a single master terminal 102 during a given period, and depending on the context, diagnosing whether or not this terminal is being used fraudulently.

In particular, observation of the request type can be used to determine if the master terminal 102 submits a single ECM channel or several ECM channels to processing, and if several channels are processed, to determine whether the ECM channels are correlated (in other words are related to the same program) or are independent (in other words are related to different programs). The same is true for the observation that the master terminal repeats requests for access to a content for which it does not normally have access rights.

Depending on their type, the number of requests thus stored is compared with a threshold beyond which the access management unit 4 diagnoses that it is a pirating attempt and it takes measures accordingly, such as stopping the transmission of data enabling access to the contents, to this terminal.

Acceptance of requests, taking account of request types, determination of the observation period, adjustment of the threshold can all be varied depending on the permissivity or severity to be assigned to this check.

The master terminal can also use the same procedure to check that the slave terminal is being used normally.

In the embodiments described above, as soon as a terminal cannot process an ECM to extract control words from it, it sends this ECM to the management unit 4 or to the master terminal 102 to obtain these control words so that it can decrypt the content. As described above, this transfer/processing of an ECM is done occasionally or during each crypto-period.

The global duration of the ECM transfer/processing by the management unit 4 or by the master terminal 102, seen from the reception terminal, must be less than the duration of one crypto-period, so that the terminal can have control words in time to descramble the content.

This condition on the global transfer/processing duration enables correct operation of the entire system during the << simple >> access to a content, in other words at normal speed with a crypto-period of the order of about 10 seconds as is usually done.

However, other usage cases occur in which this condition on the global transfer/processing duration cannot be technically satisfied, which leads to a discontinuity or even impossibility of descrambling.

In a first example, functions such as reading content stored in the terminal (PVR) or in the network (nPVR) or services such as VOD (Video On Demand) may allow the user the possibility of receiving a content at higher speeds than normal, either forwards or backwards (<< trick modes >>). During fast forward or backward access, the apparent frequency of ECMs in the content increases and the apparent cryptoperiod duration reduces. The result is that the time interval between two ECM submissions by the reception terminal to the management unit or to the master terminal reduces. Beyond a certain access speed to the content, the duration between two ECM submissions may be shorter than the global ECM transfer/processing duration. The system diverges and no longer functions.

In another example, the operator can reduce the length of the crypto-period to accelerate the renewal of control words and thus increase the difficulty of a brute force attack on cryptograms of control words or on the scrambled content, so as to strengthen protection of the content. Beyond a specific reduction in the crypto-period, the duration between two ECM submissions becomes shorter than the global ECM transfer/processing duration. As in the above example, the system diverges and no longer functions.

Using the Fast Forward or Backward Access Method.

One way of overcoming this problem of divergence and malfunction of the system in particular usage cases is to reduce the frequency at which the reception terminal submits ECMs to the management unit 4 or to the master terminal 102, while keeping part of the access control by the management unit 4 or the master terminal 102. This uses the method characteristic according to which the reception terminal occasionally sends ECMs to the management unit or to the master terminal.

The principle of this solution consists of breaking down the duration of the content into time segments, during each of which the reception terminal can process ECMs without calling upon the management unit or the master terminal. However, when changing from one segment to another, the reception terminal must call upon the management unit or the master terminal to have information, typically the key necessary for decryption of control words or access certificates satisfying the content access criterion, enabling it to process ECMs during this new segment.

Preferably, the terminal should call upon the management unit or the master terminal to obtain the decryption key of the control words for the next time segment, which means that it always satisfies the access condition, either by having the necessary access certificates, or by not checking this condition.

This solution is applicable in various uses like those presented above and it is described below in the case of fast forward and backward accesses to a content by a reception terminal connected to a management unit (4).

To achieve this, when the content is supplied to the reception terminal 6 by an operator with which an access management unit 4 is associated, the method includes a conditioning phase of the content by the operator and a usage phase of said content by the reception terminal.

The content conditioning phase includes the following steps:

a) the duration of said content is broken down into N time segments, each of which is associated with an identifier $S_j$, a key $K_j$ and data $D_j$ related to this key, each segment $S_j$ comprising an integer number $M_j$ of crypto-periods $CP_i$ for i=1 to $M_j$, b) the content is scrambled using control words $CW_{i,j}$ for i=1 to $M_j$ and j=1 to N, c) each control word $CW_{i,j}$ is encrypted by the key $K_j$, d) the content is then transmitted scrambled to the terminal during each time segment $S_j$ during each crypto-period $CP_i$, with an ECM message comprising at least the cryptogram of the control word $CW_{i,j}$ encrypted with the current key $K_j$, the data $D_j$ related to the current key $K_j$, the data $D_{j-1}$ related to the previous key $K_{j-1}$, and the data $D_{j+1}$ related to the next key $K_{j+1}$.

The << current segment >> is the segment $S_j$ currently being received by the terminal; the associated key $K_j$ is called the << current key >>. It is understood that during forward access to the content, the terminal receives successive segments in the order ... $S_j, S_{j+1}, S_{j+2}$ ..., the segment $S_{j+1}$ being the << next segment >> after segment $S_j$ in the content and using the << next key >> $K_{j+1}$, while in backward access to the content, the terminal receives successive segments in the order ... $S_j, S_{j-1}, S_{j-2}$ ..., segment $S_{j-1}$ being the << previous segment >> before segment $S_j$ in the content and using the << previous key >> $K_{j-1}$.

The usage phase of the content uses three doublets, and the terminal was previously configured to store these doublets. These doublets ($K_c, D_c$), ($K_p, D_p$), ($K_s, D_s$) are composed of a current key $K_c$ and data $D_c$ related to this key, a previous key $K_p$ and related data $D_p$, and a next key $K_s$ and related data $D_s$ respectively.

The usage phase includes the following steps on reception of each ECM message:

e) The terminal analyses the data $D_j$ contained in the ECM message and evaluates the correspondence with data available to it in the doublets.

f) If the data $D_j$ contained in the ECM message corresponds to the data $D_c$ previously stored in the terminal, the terminal decrypts the control words $CW_{i,j}$ with the key $K_c$ associated with this data $D_c$ in the corresponding doublet. In this case, the terminal does not request the management unit to do any complementary processing of the ECM.

g) If the data $D_j$ contained in the ECM message corresponds to the data $D_p$ previously stored in the terminal, the terminal decrypts the control words $CW_{i,j}$ with the key $K_p$ associated with the data $D_p$ in the corresponding doublet. This occurs by reading a content backwards when going onto the previous segment. Similarly, if the data $D_j$ contained in the ECM message corresponds to the data $D_s$, the terminal decrypts control words $CW_{i,j}$ using the key $K_s$. This occurs in forward reading of a content when going onto the next segment.

h) Finally, if the data $D_j$ contained in the ECM message does not correspond to the data $D_c$ previously stored in the terminal, the terminal sends the received ECM message to the access management unit (4) that determines the current key $K_j$ from the data $D_j$, the previous key $K_{j-1}$ from the data and the next key $K_{j+1}$ from the data $D_{j+1}$, and sends these keys and their related data to the terminal that stores their corresponding values as new values of the keys $K_c$, $K_p$ and $K_s$ and data $D_c$, $D_p$ et $D_s$ related to these keys. This happens every time when changing from one segment to another within the same content, both for forward reading and for backward reading, when changing from one content to another and when the terminal has just been reinitialised and the three doublets have not yet been updated.

In accordance with the problem that arises, the combination of steps f), g) and h) is used to compensate for an excessive global transfer/processing time compared with the crypto-period, while maintaining control over access to the content by the management unit. The presence of the current key $K_c$ in the terminal enables the terminal to decrypt control words without calling upon the management unit. However, this key is only valid during the duration of the current segment (step f, use of the current key). At the end of the segment, the terminal must use another decryption key. The terminal already has this new key (step g, use of the previous key or the next key) so as to be able to descramble the content without any discontinuity. However, to assure that the terminal can still descramble without discontinuity at the end of this new segment, it must call upon the management unit to process the ECM so that it can update its system of keys (step h). On reception of the ECM following this update, it will then recentre itself on its new current key (return to step f). Thus, descrambling continues even if duration of the supply of keys by the management unit is longer than the crypto-period, and the management unit maintains control over access to the content because the terminal must call upon it during each of the segments.

It will thus be understood that the terminal must satisfy the access condition, either by having access certificates or by not knowing this condition, because otherwise it would call upon the management unit for each ECM that would cause divergence of the system as mentioned above. Note also that when the management unit receives an ECM to determine the keys of the terminal, it can verify that the terminal actually has access certificates that satisfy the access criteria and not illegal certificates, as in the basic method.

According to one characteristic of the invention, the terminal returns the said received ECM message to the access management unit 4 through a point-to-point link.

The current key $K_j$, the previous key $K_{j-1}$ and the next key $K_{j+1}$ that the terminal must have in its doublets depending on the solution, are determined from data related to these keys present in the ECM.

In a first embodiment, the data related to the keys transmitted in the ECM include at least the cryptograms corresponding to said keys $K_j$, $K_{j-1}$ and $K_{j+1}$ that can be decrypted by a management key known exclusively to the management unit 4.

In a second embodiment, data related to keys transmitted in the ECM include at least the identifiers $S_j$, $S_{j-1}$ and $S_{j+1}$ of the corresponding segments. When the related data do not include cryptograms of said keys, the keys $K_j$, and $K_{j+1}$ are determined by the management unit 4 starting from these segment identifiers.

In a first implementation of this embodiment, the access management unit 4 determines the new keys $K_j$, $K_{j-1}$ and $K_{j+1}$ by searching in a database predefined from segment identifiers.

In another embodiment, the access management unit 4 determines the new keys $K_j$, $K_{j-1}$ and $K_{j+1}$ by diversification of a root key from segment identifiers.

During steps e) to h), the terminal evaluates the correspondence between the received related data $D_j$ and the data $D_c$, $D_p$ and $D_s$ available to it in its doublets. Preferably, this correspondence is based on segment identifiers being the same. When segment identifiers are not used, searching for correspondence consists of comparing key cryptograms.

In a third embodiment, only the data $D_j$ related to the current key $K_j$ is present in the ECM message, and the access management unit 4 uses this data to deduce the other two data $D_{j-1}$ and $D_{j+1}$ related to the previous key $K_{j-1}$ and the next key $K_{j+1}$. In a first example, data related to the keys are segment identifiers with successive numeric values . . . X−2, X−1, X, X+1, X+2 . . . . In another example, data related to the keys are cryptograms of these keys and the management unit has a prior list of these cryptograms, in the same sequential order as the segments. When the cryptogram of key $K_j$ is located in this list, the cryptogram that precedes it is the cryptogram for key $K_{j-1}$ and the cryptogram that follows it is the cryptogram for key $K_{j+1}$.

As a variant, if backwards reading of a content is not used, the data $D_{j-1}$ related to the previous key $K_{j-1}$ is not used in ECM messages and the doublet ($K_p$, $D_p$) corresponding to the previous segment may be deleted, without going outside the scope of the invention.

As a variant, the doublet, ($K_p$, $D_p$) corresponding to the previous segment may be replaced by several doublets associated with the previous $n_p$ successive segments and the doublet ($K_s$, $D_s$) corresponding to the next segment may be replaced by several doublets associated with the next $n_s$ successive segments, without going outside the framework of the invention. This extension of doublets means that the solution can be applicable even during access to the content at a speed such that the global transfer/processing time of the ECM might become greater than the apparent duration of one or several successive segments. The number of previous doublets $n_p$ or next doublets $n_s$ then depends on the maximum required access speed to the content.

The solution described above may also be used when the scrambled content is distributed to a set of installed reception terminals comprising a master terminal (102) and at least one slave terminal (104, 106, 108) dependent on said master terminal (102). In this case, the reception terminal is replaced by the slave terminal, and as seen from the slave terminal, the management unit is replaced by the master terminal.

In one embodiment, processing of the ECM sent by the slave terminal to the master terminal to obtain new values of the ($K_c$, $D_c$), ($K_p$, $D_p$), ($K_s$, $D_s$) doublets is done by the master terminal itself that is provided with means similar to the means used in a management unit, for example such as a root key diversification function, a decryption function using a management key, a cryptograms database, depending on the implementation.

In another embodiment, the master terminal (102) determines new values of the ($K_c$, $D_c$), ($K_p$, $D_p$), ($K_s$, $D_s$) doublets to be sent to the slave terminal by sending the ECM message that it receives to a management unit (4) or to a master terminal on which it depends and towards which it behaves like a slave terminal, for processing.

The preferred solution described above consists of associating a different key with a segment, the access condition always being satisfied or not known by the terminal. This solution can obviously also be applied to the case in which a different access condition is associated with each segment, the decryption key being unchanged and available in the terminal. In this case, the data Dj are related to rights and the management unit supplies the rights necessary to access the current, next and previous segments to the terminal, instead of keys.

The invention claimed is:

1. A method for access control to a content supplied to a reception terminal by an operator, with which an access management unit is associated, the method comprising:
    a conditioning phase of the content by the operator and a usage phase of the content by the terminal;
    wherein the terminal is configured to store three doublets composed of a current key $K_c$ and data $D_c$ related to the key, a previous key $K_p$ and data $D_p$ related to the previous key, and a next key $K_s$ and data $D_s$ related to the next key respectively,
    wherein the conditioning phase comprises:
    a) breaking down a duration of the content into N time segments each being associated with one identifier $S_j$, one key $K_j$ and one item of data $D_j$ related to the key, each segment $S_j$ including an integer number $M_j$ of crypto-periods $CP_i$, i=1 to $M_j$ and j=1 to N,
    b) scrambling the content using a sequence of control words $CW_{i,j}$,
    c) encrypting each control word $CW_{i,j}$ using the $K_j$ key, and
    d) transmitting the scrambled content to the terminal during each crypto-period $CP_i$, with an Entitlement Control Message (ECM) message comprising at least the encrypted control word $CW_{i,j}$, the data $D_j$ related to the current key $K_j$, the data $D_{j-1}$ related to the previous key $K_{j-1}$ and the data $D_{j+1}$ related to the next key $K_{j+1}$, to decrypt the content during a given time segment $S_j$; and
    the usage phase comprises, on reception of the ECM message:
    e) the terminal analyzing data $D_j$ contained in the message; and
    f) if data $D_j$ contained in the ECM message corresponds to the data $D_c$ previously stored in the terminal, the terminal decrypting the control word $CW_{i,j}$ with the key $K_c$ associated with the data $D_c$,
    g) if the data $D_j$ contained in the ECM message corresponds to the data $D_p$ previously stored in the terminal, the terminal decrypting the control word $CW_{i,j}$ using the key $K_p$, and if the data $D_j$ corresponds to the data $D_s$, the terminal decrypts the control word $CW_{i,j}$ using the key $K_s$, and
    h) if the data $D_j$ contained in the ECM message does not correspond to the data $D_c$ previously stored in the terminal, the terminal sending the received ECM message to the access management unit that determines the current key $K_j$ from the data $D_j$, the previous key $K_{j-1}$ from the data $D_{j-1}$ and the next key $K_{j+1}$ from the data $D_{j+1}$, and sending the keys and their related data to the terminal that stores their corresponding values as new values of the keys $K_c$, $K_p$ and $K_s$ and data $D_c$, $D_p$ and $D_s$ related to these keys, and
    wherein the data $D_j$, $D_{j-1}$ and $D_{j+1}$ transmitted in the ECM include at least the cryptograms corresponding to the keys $K_j$, $K_{j-1}$ and $K_{j+1}$ that can be decrypted by a management key known exclusively to the management unit.

2. A method according to claim 1, wherein the terminal returns the received ECM message to the access management unit through a point-to-point link.

3. A method according to claim 1, wherein the data $D_j$, $D_{j-1}$ and $D_{j+1}$ transmitted in the ECM include at least the segment identifiers $S_j$, $S_{j-1}$ and $S_{j+1}$.

4. A method according to claim 3, wherein values of the keys $K_j$, $K_{j-1}$ and $K_{j+1}$ are determined by the management unit from segment identifiers $S_j$, $S_{j-1}$ and $S_{j+1}$ respectively.

5. A method according to claim 4, wherein the access management unit determines values of the keys $K_j$, $K_{j-1}$ and $K_{j+1}$ by searching in a database predefined from segment identifiers $S_j$, $S_{j-1}$ and $S_{j+1}$ respectively.

6. A method according to claim 4, wherein the access management unit determines values of keys $K_j$, $K_{j-1}$ and $K_{j+1}$ by diversification of a root key from segment identifiers $S_j$, $S_{j-1}$ and $S_{j+1}$ respectively.

7. A method for access control to a scrambled content distributed by an operator to a set of installed reception terminals including one master terminal and at least one slave terminal dependent on the master terminal, the method comprising:

a conditioning phase of the content by the operator; and
a usage phase of the content by the slave terminal;
wherein the slave terminal is configured to store three doublets composed of a current key $K_c$, and data $D_c$ related to this key, a previous key $K_p$ and related data $D_p$, and a next key $K_s$ and related data $D_s$ respectively,
the conditioning phase comprising:

a) breaking down a duration of the content into N time segments each being associated with one identifier $S_j$, one key $K_j$ and one item of data $D_j$ related to the key, each segment $S_j$ including an integer number $M_j$ of crypto-periods $CP_i$, and for i=1 to $M_j$ and j=1 to N, b) scrambling the content using a sequence of control words $CW_{i,j}$, c) encrypting each control word $CW_{i,j}$ using the $K_j$ key, and d) transmitting the scrambled content to the slave terminal during each crypto-period $CP_i$, with an Entitlement Control Message (ECM) message comprising at least the control word $CW_{i,j}$, the data $D_j$ related to the current key $K_j$, the data $D_{j-1}$ related to the previous key $K_{j-1}$, and the data $D_{j+1}$ related to the next key $K_{j+1}$, to decrypt the content during a given time segment $S_j$; and the usage phase comrpises, on reception of the ECM message:

e) the slave terminal analyzing data $D_j$ contained in the message, and f) if data $D_j$ contained in the ECM message corresponds to the data $D_c$ previously stored in the slave terminal, the slave terminal decrypting the control words $CW_{i,j}$ with the key $K_c$ associated with the data $D_c$, g) if the slave data $D_j$ contained in the ECM message corresponds to the data $D_p$, previously stored in the slave terminal, the slave terminal decrypting the control word $CW_{i,j}$ using the key $K_p$ related to data $D_p$, and if the slave data $D_j$ corresponds to data $D_s$, the terminal decrypting the control word $CW_{i,j}$ using the key $K_s$, related to data $D_s$, and h) if the slave data $D_j$ contained in the ECM message does not correspond to the data $D_c$ previously stored in the slave terminal, the slave terminal sending the received ECM message to the master terminal that determines the current key $K_j$ from the data $D_j$, the previous key $K_{j-1}$ from the data $D_{j-1}$ and the next key $K_{j+1}$ from the data $D_{j+1}$, and sending the keys and their related data to the slave terminal that storing their corresponding values as new values of the keys $K_c$, $K_p$ and $K_s$ and data $D_c$, $D_p$ and $D_s$ related to these keys, and wherein the data $D_j$, $D_{j-1}$ and $D_{j+1}$ transmitted in the ECM include at least the cryptograms corresponding to said keys $K_j$, $K_{j-1}$ and $K_{j+1}$ that can be decrypted by a management key not known to the slave terminal.

8. A method according to claim 7, wherein the slave terminal returns the received ECM message to the master terminal through a point-to-point link.

9. A method according to claim 7, wherein data $D_j$, $D_{j-1}$ and $D_{j+1}$ transmitted in the ECM include at least segment identifiers $S_j$, $S_{j-i}$ and $S_{j+1}$.

10. A method according to claim 9, wherein values of the keys $K_j$, $K_{j-1}$ and $K_{j+1}$ sent by the master terminal to the slave terminal are determined from the segment identifiers $S_j$, $S_{j-1}$ and $S_{j+1}$ respectively.

11. A method according to claim 10, wherein the values of the keys $K_j$, $K_{j-1}$ and $K_{j+1}$ sent by the master terminal to the slave terminal are determined by searching in a database predefined from the segment identifiers $S_j$, $S_{j-1}$ and $S_{j+1}$ respectively.

12. A method according to claim 10, wherein values of keys $K_{j-1}$ and $K_{j+1}$ sent by the master terminal to the slave terminal are determined by diversification of a root key from the segment identifiers Sj, Sj−1 and Sj+1 respectively.

13. A method according to claim 7, wherein only data Dj related to the current key Kj is transmitted in the ECM, and wherein data Dj−1 and Dj+1 can be determined from the data Dj.

14. A method according to claim 10, wherein only data Dj related to the current key Kj is transmitted in the ECM, and wherein data Dj−1 and Dj+1 can be determined from the data Dj.

15. A method according to claim 7, wherein the master terminal determines the values of keys $K_j$, $K_{j-1}$ and $K_{j+1}$ and data $D_j$, $D_{j-1}$ and $D_{j+1}$, by having the ECM message processed by a management unit or a master terminal on which it depends.

* * * * *